(12) United States Patent
Bang

(10) Patent No.: US 12,297,939 B2
(45) Date of Patent: May 13, 2025

(54) COMPOSITE PIPE FORMED BY COMBINING A MAIN PORTION AND A SHORT PIPE PORTION, AND CONNECTION STRUCTURE OF THE SAME

(71) Applicant: Manhyuk Bang, Jinju-si (KR)

(72) Inventor: Manhyuk Bang, Jinju-si (KR)

( * ) Notice: Subject to any disclaimer, the term of this patent is extended or adjusted under 35 U.S.C. 154(b) by 30 days.

(21) Appl. No.: 18/032,809

(22) PCT Filed: Oct. 14, 2021

(86) PCT No.: PCT/KR2021/014286
§ 371 (c)(1),
(2) Date: Apr. 20, 2023

(87) PCT Pub. No.: WO2022/092640
PCT Pub. Date: May 5, 2022

(65) Prior Publication Data
US 2024/0003470 A1    Jan. 4, 2024

(30) Foreign Application Priority Data

Oct. 31, 2020  (KR) .................. 10-2020-0143991

(51) Int. Cl.
| F16L 23/024 | (2006.01) |
| F16L 9/04 | (2006.01) |
| F16L 13/02 | (2006.01) |
| F16L 58/18 | (2006.01) |

(52) U.S. Cl.
CPC .............. *F16L 23/024* (2013.01); *F16L 9/04* (2013.01); *F16L 58/187* (2013.01); *F16L 13/0209* (2013.01); *F16L 58/181* (2013.01)

(58) Field of Classification Search
CPC ....... F16L 23/024; F16L 9/04; F16L 23/0286; F16L 13/0209; F16L 58/181; F16L 58/185; F16L 58/187; F16L 25/10
See application file for complete search history.

(56) References Cited

U.S. PATENT DOCUMENTS

| 2,356,047 | A | * | 8/1944 | Geisinger | ............ F16L 58/187 |
| 4,883,292 | A | * | 11/1989 | Kuroki | ................... F16L 58/181 |
| 5,893,588 | A | * | 4/1999 | Esser | .................... F16L 23/024 |
| 6,737,134 | B2 | * | 5/2004 | Friedrich | |
| 2017/0129001 | A1 | * | 5/2017 | Bouey | ................. F16L 13/0236 |

FOREIGN PATENT DOCUMENTS

| JP | 2020523542 A | | 8/2020 |
| KR | 2015008557 A | * | 1/2015 |
| KR | 101870297 B1 | | 6/2018 |
| KR | 101960492 B1 | | 3/2019 |
| KR | 1020190083934 A | | 7/2019 |
| KR | 1020200119025 A | | 10/2020 |

OTHER PUBLICATIONS

KR-2015008557-A—Machine Translation—English (Year: 2015).*
International Search Report mailed Jan. 3, 2022 for PCT/KR2021/014286, citing the above reference(s).

* cited by examiner

*Primary Examiner* — William S. Choi
(74) *Attorney, Agent, or Firm* — CANTOR COLBURN LLP

(57) ABSTRACT

The composite pipe according to the present invention is made by combining the main portion and the short pipe portion, and has the advantage that the inner pipe of the main portion can be firmly coupled to the inner surface of the short pipe portion without bending or stepping.

7 Claims, 16 Drawing Sheets

-- Prior Art --

-- Prior Art --

COMPOSITE PIPE FORMED BY COMBINING A MAIN PORTION AND A SHORT PIPE PORTION, AND CONNECTION STRUCTURE OF THE SAME

TECHNICAL FIELD

The present invention relates to a composite pipe formed by combining a main portion and a short pipe portion, and more specifically, one end of the short pipe portion is coupled to one end of the main portion by watertight welding and an inner pipe of the main portion is welded to the inner surface of the short pipe portion while maintaining straight state without a bent portion or a step so that the inner pipe is coupled to the short pipe portion firmly.

In addition, the present invention also relates to a connection structure of the composite pipe.

This application claims priority based on Republic of Korea Patent Application No. 10-2020-0143991 (title of invention: a composite pipe formed by combining a main portion and a short pipe portion, and connection structure of the same. filed on Oct. 31, 2020), and all contents included in the specification and drawings of Republic of Korea Patent Application No. 10-2020-0143991 are included in this specification.

BACKGROUND ART

In general, a steel pipe or a cast iron pipe has been widely used as a large water pipe. Cast iron pipes have a problem in that rust and scale generated therein cause deterioration in water quality. In order to solve the problem, the inner surface of the cast iron pipe may be coated with cement or epoxy resin etc., but the cement and epoxy resin may be separated from the inner surface to contaminate water and block the pipe.

Although the cast iron pipe has the problems, the cast iron pipe has been continuously used as a water pipe since no pipe can surpass the excellent physical properties of the cast iron pipe against water pressure or water impact acting on thereon.

By the way, the central government or local governments have made efforts to supply clean water by investing a huge budget in water purification plants, but due to the above problems of cast iron pipes, each household is reluctant to drink tap water without using a water purifier.

On the other hand, stainless steel pipes have excellent corrosion resistance and good water taste, so they may be used as water pipe, but their use is extremely limited because of their high price and problems such as soil corrosion (potential corrosion, etc.) in some areas.

However, everyone admits that stainless steel pipe is most suitable for drinking water. Therefore, pipe using stainless steel and having inexpensive price and high strength is required.

By considering the points described above, the present applicant developed a large composite pipe as shown in FIGS. 1 and 2. The large composite pipe 1 is composed of a stainless steel pipe 3, a steel pipe 2, and an anticorrosive layer 4 (a resin layer). It is manufactured by expanding the stainless steel pipe 3 and the steel pipe 2 after inserting the stainless steel pipe 3 into the steel pipe 2. An adhesive layer 5 may be formed between the stainless steel pipe 3 and the steel pipe 2 in order to firmly couple the stainless steel pipe 3 and the steel pipe 2.

However, the large composite pipe 1 has a problem in that the stainless steel pipe 3 and the steel pipe 2 be separated from each other at the end thereof.

DISCLOSURE

Technical Goal

The present invention is proposed to solve the above problems, and the object thereof is to provide the composite pipe 10 made by combining the main portion 20 and the short pipe portion 50 so as to be watertight, that is to say, one end of the short pipe portion is coupled to one end of the main portion by watertight welding and an inner pipe of the main portion is welded to the inner surface of the short pipe portion while maintaining straight state without a bent portion or a step so that the inner pipe is coupled to the short pipe portion firmly.

Another object of the present invention is to provide a connection structure of the composite pipe.

Technical Solution

To achieve the above objects, the composite pipe 10 according to the present invention includes a main portion 20; and a short pipe portion 50 having a shorter length than that of the main portion 20 and having grooves 53 or protrusions continuously formed on its outer surface in the circumferential direction. The short pipe portion 50 is coupled to a first end of both ends of the main portion 20 to be watertight, and thus liquid or gas can move through the short pipe portion 50 and the main portion 20.

The main portion 20 may include an outer pipe 21; an inner pipe 30 inserted into the outer pipe 21; an adhesive layer 40 formed between the inner and outer pipes 30, 21 to couple the inner and outer pipes 30, 21; and, a resin layer 42, 44 formed on the outer surface of the outer pipe 21. The short pipe portion 50 and the inner pipe 30 may be made of a material having greater corrosion resistance than that of the outer pipe 21. For example, the outer pipe 21 may be a steel pipe, and the inner pipe 30 and the short pipe portion 50 may be stainless steel pipes.

Preferably, the end side surface of the short pipe portion 50 is coupled to the end side surface of the outer pipe 21 so as to be watertight by welding or the like. In addition, the inner pipe 30 extends further into the short pipe portion 50 than the outer pipe 21, and the extended portion is bonded or welded to the inner surface of the short pipe portion 50.

An expansion portion may be formed at the second end of the main portion 20. When the composite pipes 10 are connected to each other, the short pipe portion 50 is inserted into the expansion portion of the adjacent composite pipe 10. In addition, at least a part of the outer surface of the short pipe portion 50 may be coated with a resin integrally formed with the resin layers 42, 44 of the main portion. Preferably, the part of the outer surface of the short pipe portion 50 closer to the first end than the groove 53 may be coated with the resin.

In another aspect of the present invention, the short pipe portion 50 is inserted into the expansion portion of the adjacent composite pipe 10. In addition, the composite pipe connection structure may include a watertight ring 120, 120a inserted between the expansion portion and the short pipe portion 50; a flange 130 having an insertion portion 133 inserted between the expansion portion and the short pipe portion 50 and a fastening portion 135 extending vertically from the insertion portion 133; a support ring 140 installed on the expansion portion and having a ring shape; and, a fastening bolt 150 fastening the flange 130 and the support ring 140.

Step 134 or grooves may be continuously formed on the inner surface of the insertion part 133 in a portion corresponding to the groove 53 along the circumferential direction. In addition, the stopper ring 110 is installed in the groove 53, and a part of the stopper ring 110 protrudes from the groove 53. The flange 130 may be fixed to the short pipe portion 50 and separation of the short pipe portion 50 may be prevented by the protruding part caught on the step 134 or inserted into the groove.

By the fastening bolt 150 fastening the flange 130 and the support ring 140 and by the flange 130 being fixed to the short pipe portion 50, the support ring 140 presses the expansion portion against the watertight ring 120 and the separation of the short pipe portion 50 can be prevented.

The stopper ring 110 is preferably made of a metal having rigidity and corrosion resistance to the extent that its deformation is limited so as to prevent movement of the composite pipe 10 and the flange 130, for example, stainless steel. And, it is preferable that the stopper ring 110 is not a perfect circle but an arc, more preferably an arc having a central angle of 270° or more and less than 360°.

The expansion portion may have a first inclined portion 22, and a first extended portion 23 extending horizontally from the first inclined portion 22. The watertight ring 120 may be installed on the first inclined portion 22 or may be installed across the first inclined portion 22 and the first extended portion 23.

The inner surface of the support ring 140 has a third inclined portion 141 and a third extended portion 142 to match the first inclined portion 22 and the first extended portion 23 respectively. And, due to the fastening force of the fastening bolt 150, the third inclined portion 141 closely contacts to the first inclined portion 22 and the third extended portion 142 closely contacts to the first extended portion 23.

A ring member 122 may be installed between the watertight ring 120, 120a and the insertion portion 133. The ring member 122 uniformly transmits the pressing force transmitted from the insertion portion 133 to the watertight ring 120, 120a so that the watertight ring 120, 120a contacts uniformly to the first inclined portion 22.

Advantageous Effects

The present invention has the following effects.

First, the composite pipe is manufactured by watertight coupling of the main portion 20 and the short pipe portion 50. The inner pipe 30 of the main portion 20 can be firmly coupled to the inner surface of the short pipe portion 50 by welding in a straight state without bending or stepping.

Second, the watertight ring 120, 120a is strongly contact to the expansion portion and the short pipe portion 50.

Third, separation of the pipe is prevented.

Fourth, since the fastening direction of the fastening bolt 150 and the direction of hydraulic pressure are perpendicular to each other, even if the fastening bolt 150 is corroded or the fastening force is loosened, no leakage occurs.

DESCRIPTION OF DRAWINGS

FIGS. 5 to 10 are cross-sectional views sequentially showing a process of manufacturing the composite pipe according to the manufacturing method of FIG. 4a.

BEST MODE

Figure 1:
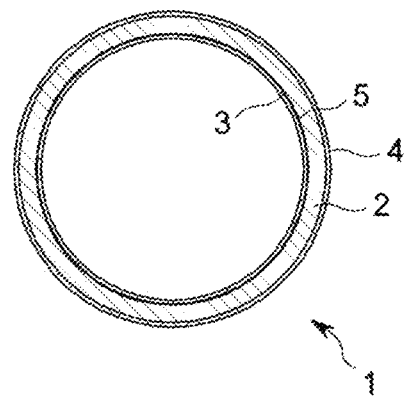
FIG. 1 is a view showing a cross section of a composite pipe.
Figure 2:
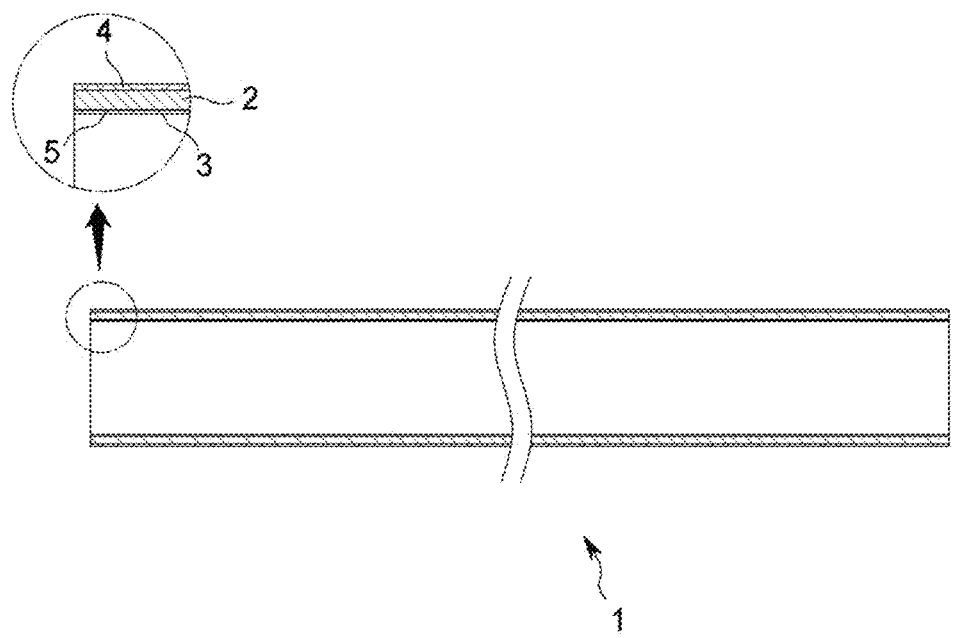
FIG. 2 is a view showing a longitudinal section of the composite pipe of FIG. 1.

Hereinafter, the present invention will be described in detail with reference to the accompanying drawings. Prior to this, the terms or words used in this specification and claims should not be construed as being limited to the usual or dictionary meaning. And it should be interpreted as a meaning and concept consistent with the technical idea of the present invention based on the principle that the inventor can appropriately define the concept of the term in order to explain his/her invention in the best way. Therefore, since the embodiments described in this specification and the configurations shown in the drawings are merely embodiments of the present invention and do not represent all of the technical spirit of the present invention, it should be understood that there may be various equivalents and variations that can replace them at the time of the present application.

[Composite Pipe]

Figure 3:
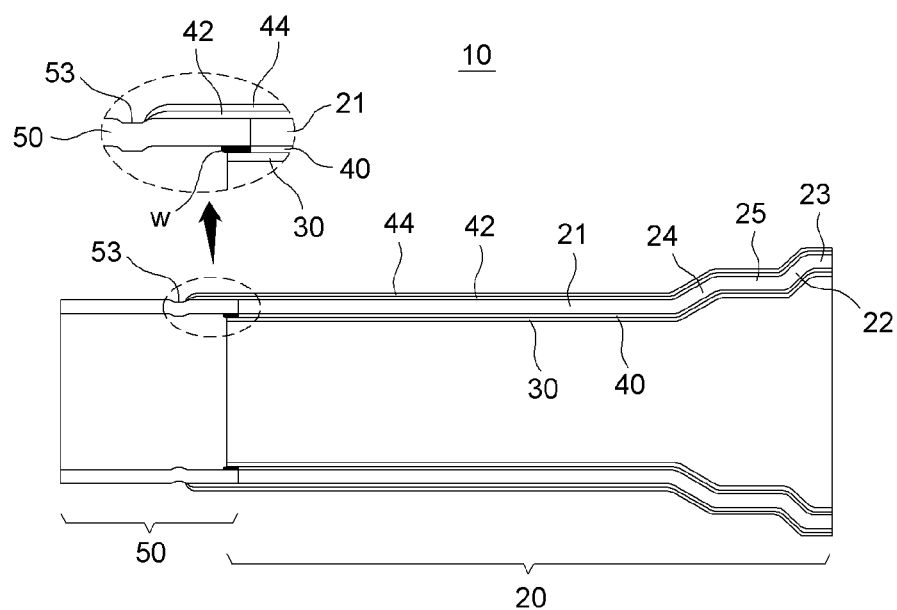
FIG. 3 is a view showing a longitudinal section of the composite pipe according to a preferred embodiment of the present invention.

FIG. 3 is a view showing a longitudinal section of the composite pipe according to a preferred embodiment of the present invention. As shown in the Figure, the composite pipe 10 is formed by watertight coupling of the main portion 20 and the short pipe portion 50.

The main portion 20 may have the outer pipe 21, the inner pipe 30 inserted into the outer pipe 21, the adhesive layer (resin layer, 40) between the inner and outer pipes 30, 21, and a resin layer (coating layer, 42, 44) coating the outer pipe 21. And, an expansion portion may be formed in one end of the main portion 20.

A steel pipe such as a carbon steel pipe for piping, an alloy steel pipe, or a galvanized steel pipe may be used as the outer pipe 21. Since the steel pipe has excellent strength, the composite pipe including the steel pipe has excellent strength.

The inner pipe 30 is inserted into the outer pipe 21 and then coupled to the outer pipe 21 by expansion and/or the adhesive layer 40. The outer diameter of the inner pipe 30 is slightly smaller than the inner diameter of the outer pipe 21, and has a diameter difference that can be tightly coupled to the inner surface of the outer pipe 21 by a pipe expansion process.

The pipe expansion is a method for coupling heterogeneous pipes to each other, and may be performed by hydroforming or a pipe expansion mold. Since the hydroforming and the pipe expansion mold are well known in the art, a description thereof will be omitted.

The inner pipe 30 may be made of a material having higher corrosion resistance than the outer pipe 21, and for example, a stainless steel pipe may be used as the inner pipe 30. The stainless steel pipe 30 is a pipe made of stainless steel, and as known, has excellent corrosion resistance and is hygienic, so it can solve the problem of rust and scale of the conventional cast iron pipe.

The thickness of the stainless steel pipe 30 (inner pipe) is preferably 5% to 50% of the thickness of the steel pipe 21. If the thickness of the stainless steel pipe 30 (inner pipe) is less than 5% of the thickness of the steel pipe 21, it is not preferable in terms of corrosion resistance and the like. And, if the thickness of the stainless steel pipe 30 (inner pipe) exceeds 50% of the thickness of the steel pipe 21, the stainless steel becomes thicker than necessary and the price of the composite pipe 10 becomes too expensive, resulting in poor economic efficiency.

The inner pipe 30 extends further into the short pipe portion 50 than the outer pipe 21. The extended portion is coupled to the inner surface of the short pipe portion 50 to be watertight by welding, whereby the inner pipe 30 is firmly fixed and the watertightness between the short pipe portion 50 and the main portion 20 is improved.

Preferably, the length of the extended portion (L in FIG. 9) is shorter than the length of the short pipe portion 50, and the portion of the short pipe portion 50 to which the inner pipe is not extended is exposed to liquid or gas flowing inside the composite pipe.

The adhesive layer 40 couples the inner pipe 30 and the outer pipe 21 together with the pipe expansion. As an alternative to this, they may be combined by only the adhesive layer or by only the pipe expansion. The adhesive layer 40 may be formed by applying a conventional adhesive, but the adhesive layer 40 may also be polyurea layer made by spraying aromatic diisocyanate and an aromatic or aliphatic amine having 3 or more linear carbon atoms in a ratio of 1:1 (volume ratio) to the inner surface of the outer pipe 21 and/or the outer surface of the inner pipe 30 and then heating to a temperature (180~320° C.) at which plasticization occurs. As an alternative to this, after heating the inner surface of the outer pipe 21 and/or the outer surface of the inner pipe 30 to a temperature (180 to 320° C.) at which plasticization occurs, aromatic diisocyanate and an aromatic or aliphatic amine having 3 or more linear carbon atoms are sprayed at a ratio of 1:1 (volume ratio) on the heated surface to form plasticized polyurea layer (adhesive layer).

The resin layer 42 (firstly applied resin layer) is formed to cover the outer surface of the outer pipe 21. Preferably, the resin layer 42 may be formed of a polyethylene layer (PE layer), a polyurea layer made by heating to a temperature (180 to 320° C.) at which plasticization occurs. Method for forming the polyurea layer may be the same as the method of forming the adhesive layer 40 described above.

The resin layer 42 is preferably formed to a thickness of approximately 300 μm to 3,000 μm to prevent corrosion of the outer pipe 21. If the thickness is less than 300 μm, there is a risk that insulation may not be performed or the resin layer 42 may be peeled off, and if the thickness exceeds 3,000 μm, more resin is required than necessary and the outer diameter of the pipe becomes larger than necessary.

In addition, in order to firmly adhere the resin layer 42 to the outer pipe 21, an adhesive (not shown in the drawing) may be first applied to the outer pipe 21, and then the resin may be applied.

Preferably, a resin layer 44 may be formed by secondarily applying a resin on the resin layer 42. The material and application method of the resin layer 44 may be the same as those of the resin layer 42.

The expansion portion is an expanded part at the end of the main portion 20 so that the diameter thereof is increased, and when connecting the composite pipes, the short pipe portion of the neighboring composite pipe 10 is inserted into the expansion portion (this will be described later).

The expansion portion may include first and second inclined portions 22, 24 and first and second extended portions 23, 25.

The first inclined portion 22 extends from the second extended portion 25 and is formed as an upwardly inclined surface toward the end of the pipe. And, the first extended portion 23 is a portion extending horizontally from the first inclined portion 22 to the end of the pipe.

The second extended portion 25 is a part extending horizontally to connect the first and second inclined portion 22, 24.

And, the second inclined portion 24 is a part in which an upwardly inclined surface toward the pipe end is continuously formed along the circumferential direction. The second inclined portion 24 has a diameter corresponding to that of the short pipe portion 50, and when the short pipe portion 50 moves into the composite pipe 10 due to vibration or earthquake, the second inclined portion 24 stops the short pipe portion's insertion by abutting on the end of the short pipe portion 50 (this point will be described later).

The short pipe portion 50 may be made of a material having greater corrosion resistance (a material having excellent corrosion resistance) for example, a stainless steel pipe than the outer pipe 21 in a soil environment. The short pipe portion 50 is coupled to the first end of the outer pipe 21 by welding or the like, and more specifically, the end side surface of the short pipe portion 50 is coupled to the end surface side of the outer pipe 21 so as to be watertight by welding. To this end, it is preferable that the thickness of the short pipe portion 50 is the same as or similar to the thickness of the outer pipe 21, and accordingly, the inner surface of the short pipe portion 50 may be located on the same plane as the inner surface of the outer pipe 21. In this specification, 'same thickness' not only means the same thickness mathematically, but also means thickness difference to the extend that the inner pipe 30 inserted in the outer pipe 21 is welded to the inner surface of the short pipe portion 50 without big bending or big step. Likewise, 'on the same plane' not only means the same plane mathematically, but also means some difference to the extend that the inner pipe 30 inserted in the outer pipe 21 can be welded to the inner surface of the short pipe portion 50 without big bending or big step.

The short pipe portion 50 has a shorter length than the main portion 20. For example, if the total length of the composite pipe 10 is 6 to 12 m, the short pipe portion 50 may have a length of 0.3 to 0.5 m. And, the length ratio of the outer pipe 21 and the short pipe portion 50 shown in the drawings is exemplary and should not be understood as limiting the scope of the present invention.

Groove 53 are continuously formed on the outer surface of the short pipe portion 50 along the circumferential direction. A stopper ring (110 in FIGS. 13, 14) is installed in the groove 53, which will be described below. Meanwhile, instead of the groove 53, protrusion (not shown in the drawings) may be continuously formed along the circumferential direction. The protrusion may replace the stopper ring 110. That is, the protrusion may play a role of being caught on the step (134 in FIGS. 13, 14) instead of the stopper ring 110.

In addition, a resin layer (not shown in the drawing) may be formed on the outer surface of the short pipe portion 50. As an alternative to this, the part of the outer surface of the short pipe portion 50 that is closer to the main portion 20 than the groove 53 is coated by the resin layer (coating layer, 42, 44) since the part is exposed to the soil after construction, and the part of the outer surface of the short pipe part 50 farther from the main portion 20 than the groove 53 may not be coated by the resin layer since it is inserted into the expansion portion. Meanwhile, the resin layer of the short pipe portion 50 may be formed integrally and continuously with the resin layers 42, 44.

[Manufacturing Process 1 of the Composite Pipe]

Figure 4A:
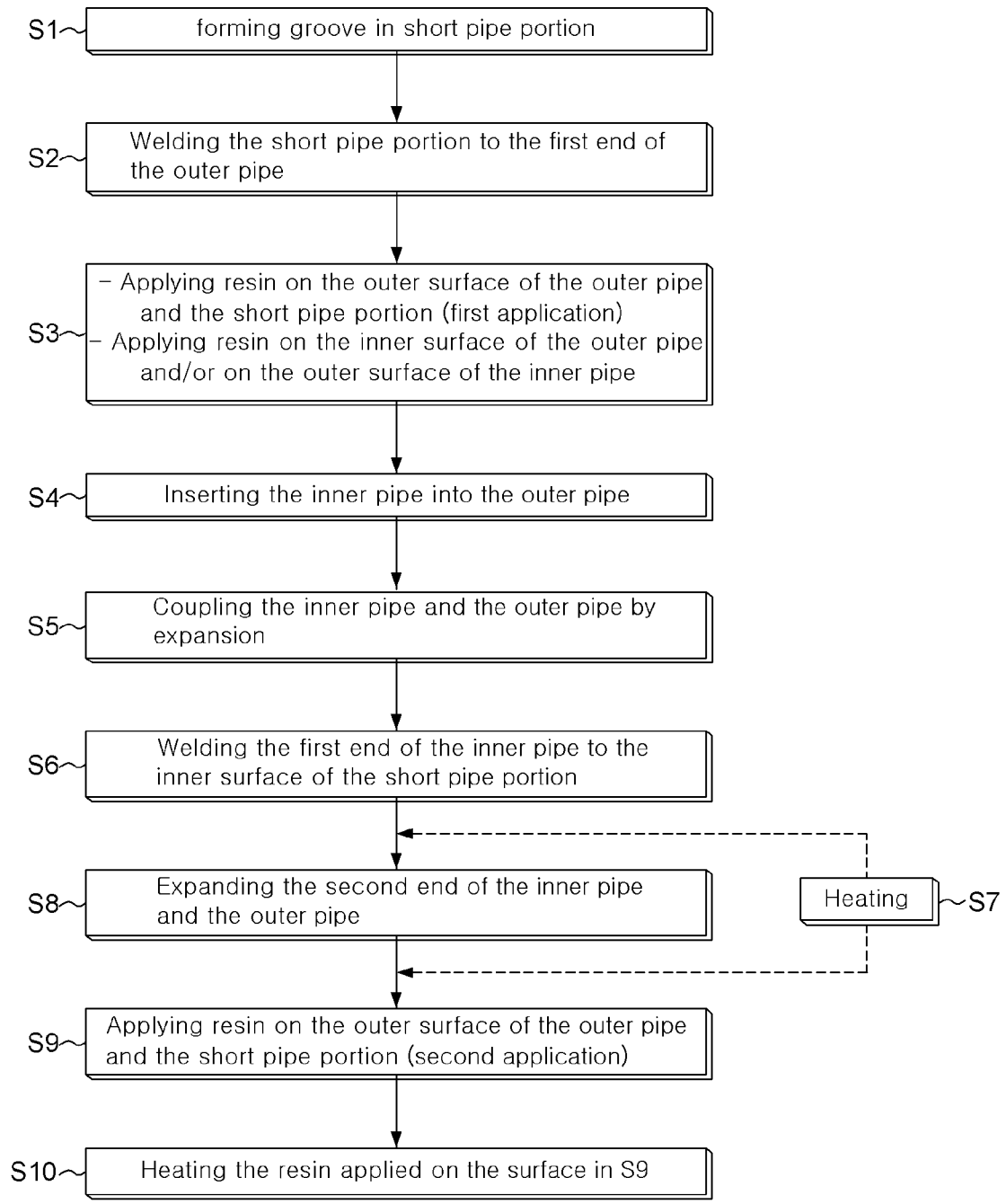
FIG. 4a and FIG. 4b are a flow chart showing a manufacturing method for the composite pipe respectively.

FIG. 4a is a flow chart showing a method for manufacturing the composite pipe, and FIGS. 5 to 10 are views sequentially showing the manufacturing method. In the drawings, the thicknesses of the adhesive layer 40 and the resin layers 42, 44 are exaggerated than they actually are, but this is only to help understand the drawings. And, the thickness ratio of the outer pipe 21, the inner pipe 30, the adhesive layer 40, and the resin layer 42, 44 is exemplary, and the ratios shown in the drawings should not be interpreted as limiting the scope of the present invention.

Figure 5:
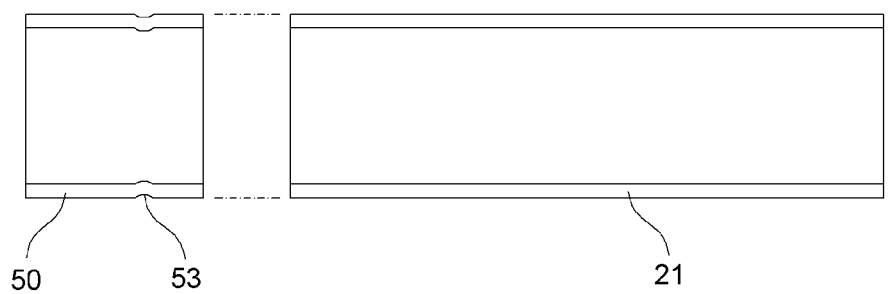

First, as shown in FIG. 5, groove 53 is continuously formed in the circumferential direction on the outer surface of the short pipe portion 50 (S1). Meanwhile, a protrusion may be formed instead of the groove 53. Then, the short pipe portion 50 is welded to the first end of the outer pipe 21 to couple the short pipe portion 50 and the outer pipe 21 (S2).

Figure 6:
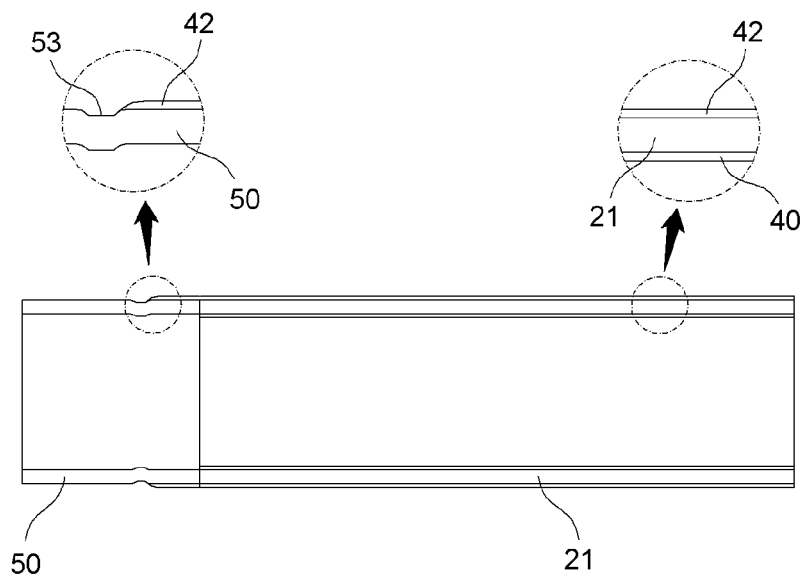

Subsequently, as shown in FIG. 6, a resin layer 42 is formed by firstly applying a resin to the outer surface of the outer pipe 21 and the short pipe portion 50, and adhesive layer 40 is formed on the inner surface of the outer pipe 21 or the outer surface of the inner pipe 30 (S3).

Preferably, the part of the outer surface of the short pipe portion 50 that is closer to the outer pipe 21 than the groove 53 is coated by the resin layer 42, and the part of the outer surface of the short pipe part 50 farther from the outer pipe 21 than the groove 53 may not be coated by the resin layer.

Figure 7:
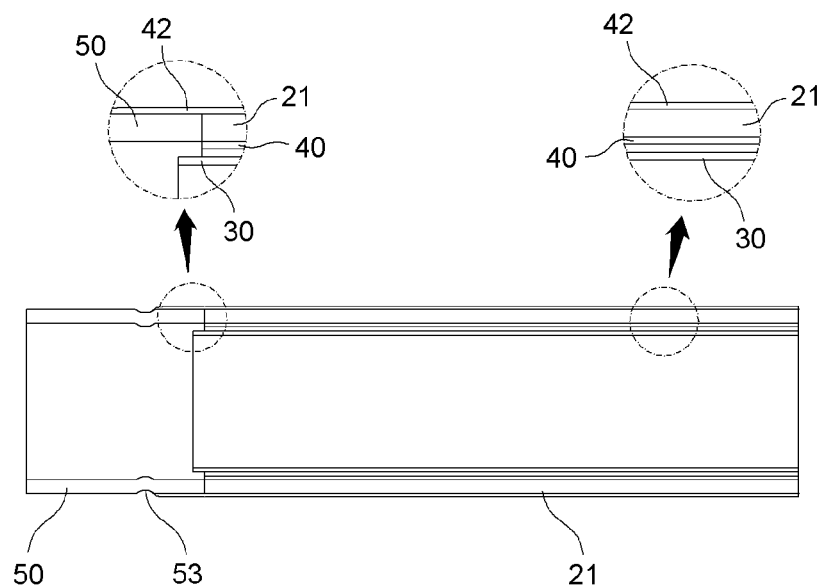
Figure 8:
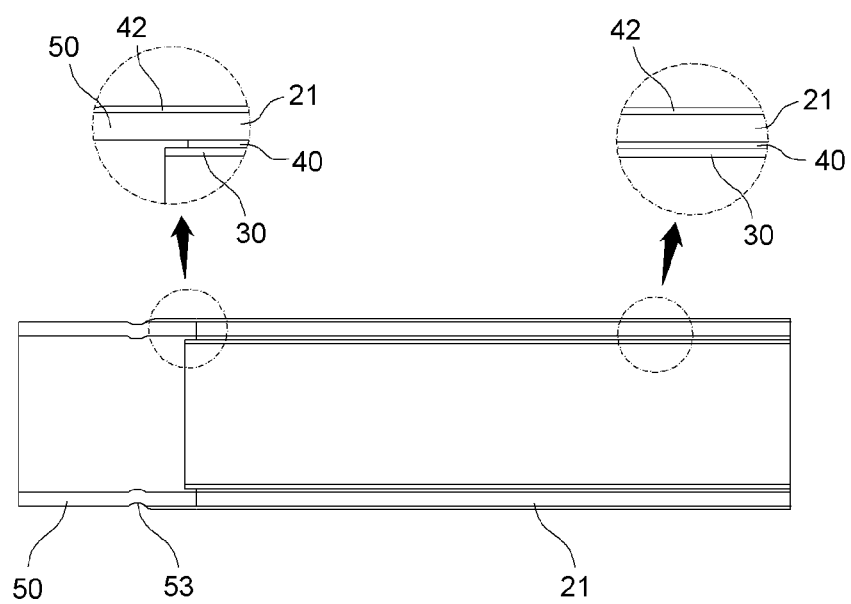

Next, as shown in FIG. 7, the inner pipe 30 is inserted in the outer pipe 21 (S4). Subsequently, as shown in FIG. 8, the outer pipe 21 and the inner pipe 30 are expanded to couple the outer pipe 21 and the inner pipe 30 (S5).

Figure 9:
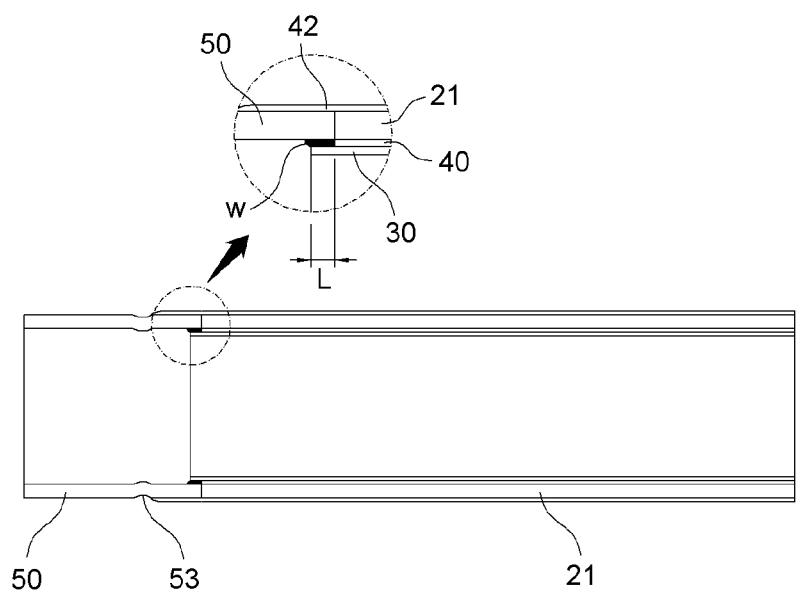

After the step S5, as shown in FIG. 9, the first end of the inner pipe 30 is welded to the inner surface of the short pipe portion 50 so as to be watertight (S6). In FIG. 9, w represents a welded portion.

Figure 10:
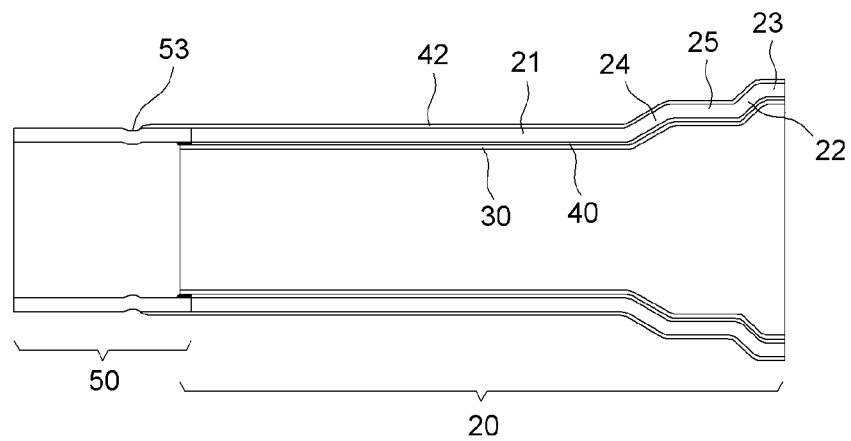

After the step S6, the main portion 20 is heated (S7), and then the second end of the main portion 20 is expanded (S8). FIG. 10 shows a cross section after the expansion.

Subsequently, a resin layer 44 is formed by applying secondly a resin on the resin layer 42. FIG. 3 shows the composite pipe 10 after the secondary application is completed. The material and coating method of the resin layer 44 may be the same as those of the resin layer 42.

Meanwhile, the heating step (S7) may be performed between steps S6 and S8, but may also be performed between steps S8 and S9.

[Manufacturing Process 2 of the Composite Pipe]

Figure 4B:
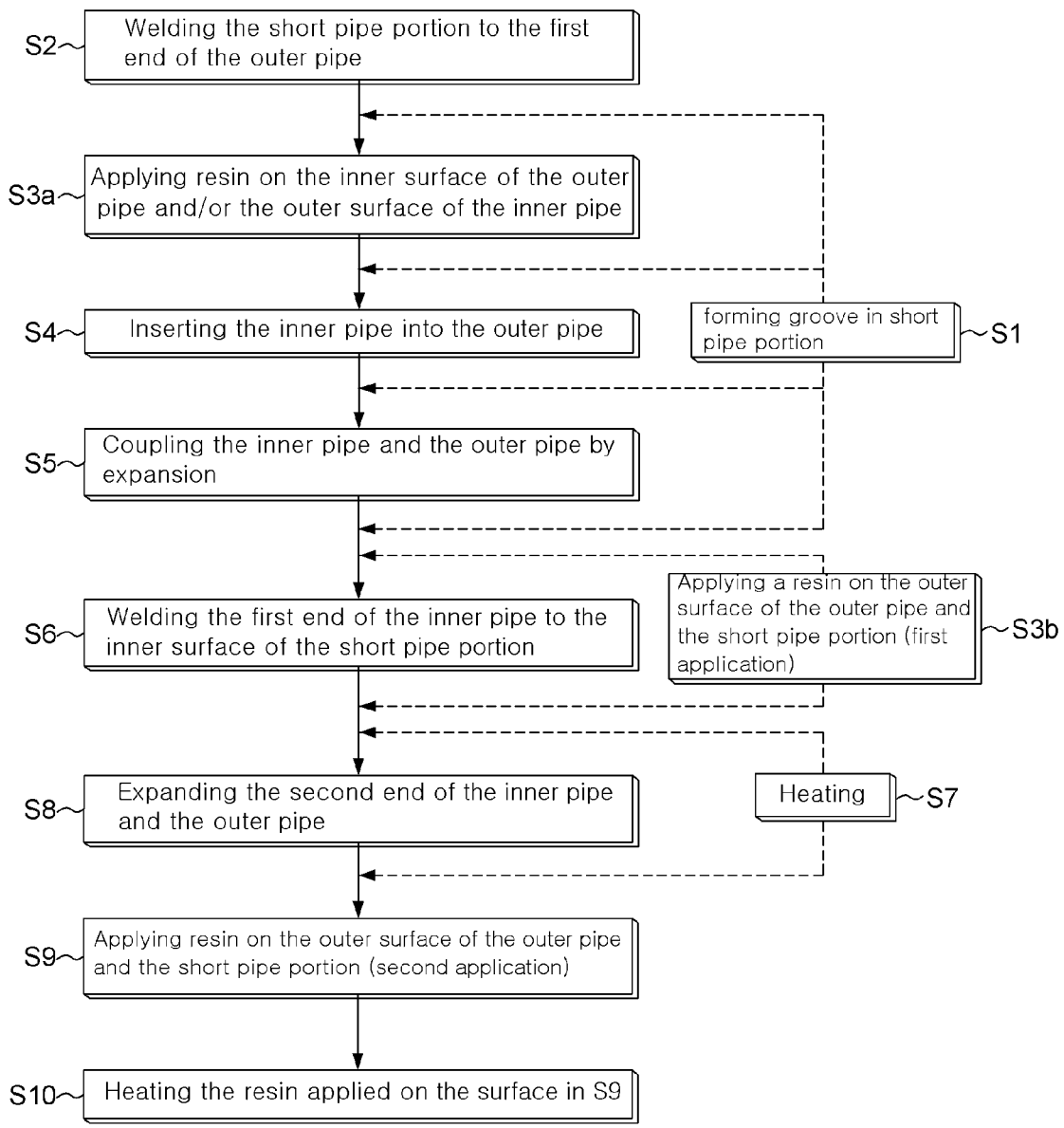

FIG. 4b is a flow chart showing another manufacturing method of the composite pipe.

Compared to the manufacturing method of FIG. 4a, the process positions of step S1 and step S3b are different, and the rest of the steps are the same.

As shown in the figure, the step S1 of forming the groove 53 in the short pipe portion 50 may be 'between step S2 and step S3a' or 'between step S3a and step S4' or 'between step S4 and step S5' or 'between step S5 and step S6' (however, when step S3b is performed between step S5 and step S6, it may be performed between step S5 and step S3b). The dotted line in the figure shows this.

In addition, the step of applying firstly the resin to the outer surface of the outer pipe 21 and the short pipe portion 50 (S3b) is performed between steps S5 and S6 (however, when step S1 is performed between steps S5 and S6, the step S3b is performed between steps S1 and S6) or between steps S6 and S8. The dotted line in the figure shows this.

[Connection Structure of the Composite Pipe]

Figure 11:
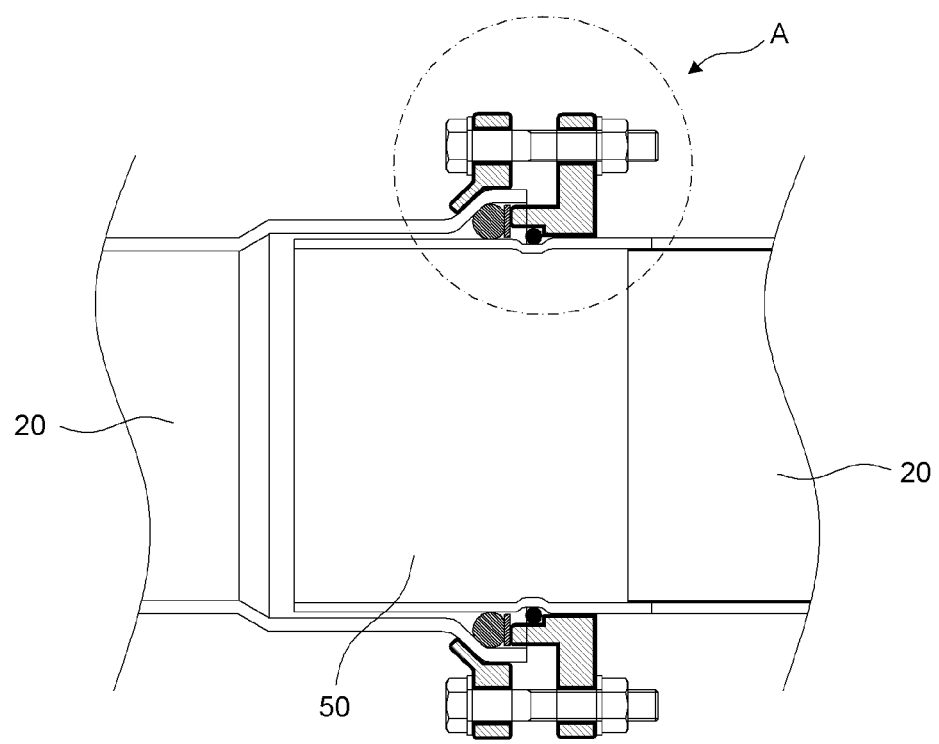
FIG. 11 is a cross-sectional view showing a connection structure of the composite pipe.
Figure 12A:
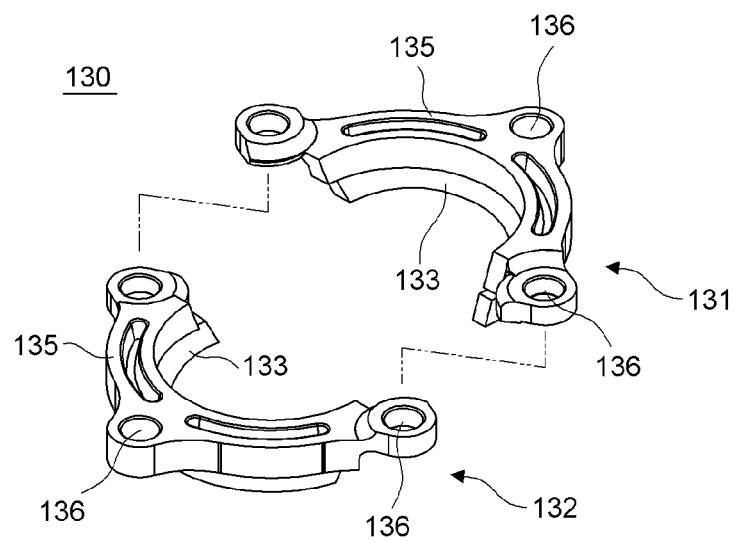
FIG. 12a is an exploded perspective view showing a flange provided in the connection structure of FIG. 11.
Figure 12B:
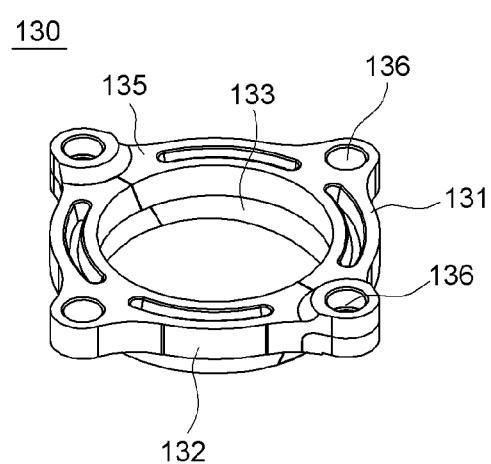
FIG. 12b is a combined perspective view showing the flange.
Figure 13:
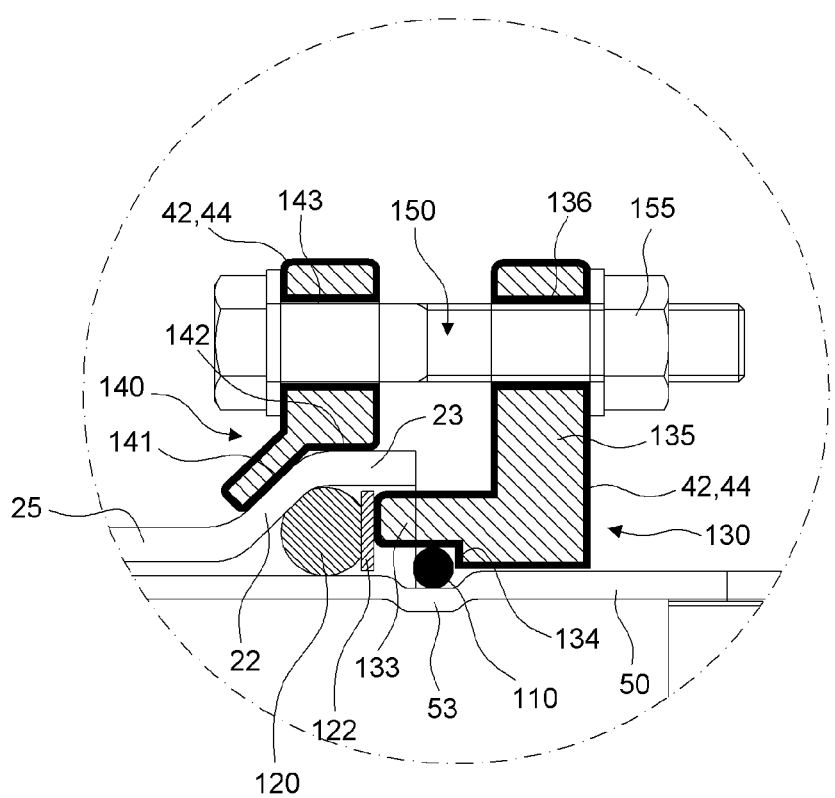
FIG. 13 is an enlarged view of part A of FIG. 11.

FIG. 11 is a cross-sectional view showing the connection structure of the composite pipe, FIG. 12a is an exploded perspective view showing a flange provided in the connection structure, and FIG. 12b is a combined perspective view showing the flange. And, FIG. 13 is an enlarged view of part A of FIG. 11.

As shown in the figures, the connection structure includes a watertight ring 120 inserted between the expansion portion and the short pipe portion 50, a groove 53 formed on the outer surface of the short pipe portion 50 in the circumferential direction, the stopper ring 110 installed in the groove 53, the flange 130 installed in the short pipe portion 50, the support ring 140 installed in the expansion portion, and fastening bolt 150 fastening the flange 130 and the support ring 140.

Among the components, at least the flange 130 and the support ring 140 may be coated with resin, for example, polyurea. The coating may be formed with the same composition and heating method (including the plasticization method) as those of the resin layer 42 described above.

The short pipe portion 50 is inserted into the expansion portion of the adjacent composite pipe 10. The expansion portion is an expanded portion of which the diameter is increased so that the short pipe portion 50 can be inserted. As described above, the expansion portion may include the first and second inclined portions 22, 24 and the first and second extended portions 23, 25.

The watertight ring 120 is a circular ring, and is installed between the short pipe portion and the expansion portion to form a watertight seal. The watertight ring 120 may be made of rubber, synthetic resin, or the like.

Preferably, among both sides of the watertight ring 120, a ring member 122 may be installed on the side facing the flange 130. The ring member 122 uniformly transmits the pressing force transmitted from the insertion portion 133 to the watertight ring 120 so that the watertight ring 120 uniformly contacts to the first inclined portion 22.

The flange 130 may include a first flange 131 and a second flange 132. As shown in FIGS. 12a to 12b, the first and second flanges 131, 132 each have a semicircular shape, and both ends of the first flange 131 are coupled to both ends of the second flange 132.

The first and second flanges 131, 132 may include an insertion portion 133 and a fastening portion 135, respectively.

The insertion portion 133 is inserted and installed between the expansion portion and the short pipe portion 50. The insertion portion 133 is a part formed horizontally, and has a step 134 on its inner surface. The step 134 is continuously formed along the circumferential direction. A stopper ring 110 is installed on the step 134, which will be described later. Instead of the step 134, a groove in which the stopper ring 110 can be seated may be continuously formed on the inner surface of the insertion portion 133 along the circumferential direction.

The fastening portion 135 is a part extending vertically from the end of the insertion portion 133. A plurality of bolt holes 136 are formed at predetermined angular intervals in the fastening portion 135, and the bolt holes 136 are formed at both ends of the fastening portion 135. In addition, after the bolt holes 136 at both ends are arranged to overlap each other, the fastening bolts 150 pass through the bolt holes 143, 136 and are fastened with the nuts 155, so that the first and second flanges 131, 132 are coupled to each other, and the first and second flanges 131, 132 are also coupled to the support ring 140.

In this way, since the fastening direction of the fastening bolt 150 (longitudinal direction of the pipe) and the direction of the water pressure (radial direction of the pipe) are perpendicular to each other, even if the fastening bolt 150 is corroded later or the fastening force is loosened, the fastening bolt (150) is not separated, so no leakage occurs.

The support ring 140 is a ring-shaped member installed on the first inclined portion 22 and the first extended portion 23. A third inclined portion 141 and a third extended portion 142 are formed on the inner surface of the support ring 140.

The third inclined portion 141 has an inclination that matches the first inclined portion 22 (that is to say, the same inclination), and the third extended portion 142 extends horizontally to be parallel to the first extended portion 23.

The bolt hole 143 is a hole through which the body thread part of the fastening bolt 150 passes. The fastening bolt 150 includes a bolt head and a body thread part. The fastening bolts 150 may be installed at predetermined angular intervals in the support ring 140 and the first and second flanges 131, 132. The number and spacing of the fastening bolts 150 may be increased or decreased as needed.

When the nut 155 is tightened, the support ring 140 presses the first inclined portion 22 and the first extended portion 23, and thus the watertight ring 120 is closely contact to the first inclined portion 22, the first extended portion 23, and the short pipe portion 50, and the insertion portion 133 supports and presses the side of the watertight ring 120, and watertightness is achieved and separation of the short pipe portion 50 can be prevented by firmly coupling the flange 130 to the short pipe portion 50 due to the step 134, the stopper ring 110, and the groove 53.

The stopper ring 110 is installed in the groove 53. The stopper ring 110 is an arc shape that can be installed by being fitted into the groove 53, and is preferably an arc-shaped ring having a central angle of 270° or more and less than 360°. That is, since the stopper ring 110 is not a perfect circle, it can be installed in the groove 53 after slightly widening both ends thereof.

When the stopper ring 110 is installed in the groove 53, at least a portion of the cross section of the stopper ring 110 protrudes from the groove 53. And, the protruding part is caught on the step 134. Separation of the short pipe portion 50 can be prevented by the protruding part being caught on the step 134 and coming into contact with the inner surface of the insertion portion 133 (that is to say, the separation of the two composite pipes caused by the backward movement of the composite pipe can be prevented). In addition, since the end of the short pipe portion 50 comes into contact with the second inclined portion 24, the insertion depth of the short pipe portion 50 may be limited.

The stopper ring 110 should have limited deformation when a load is applied, and for this purpose, the stopper ring 110 is preferably made of a metal having a certain level of rigidity and corrosion resistance, for example, stainless steel.

Figure 14:
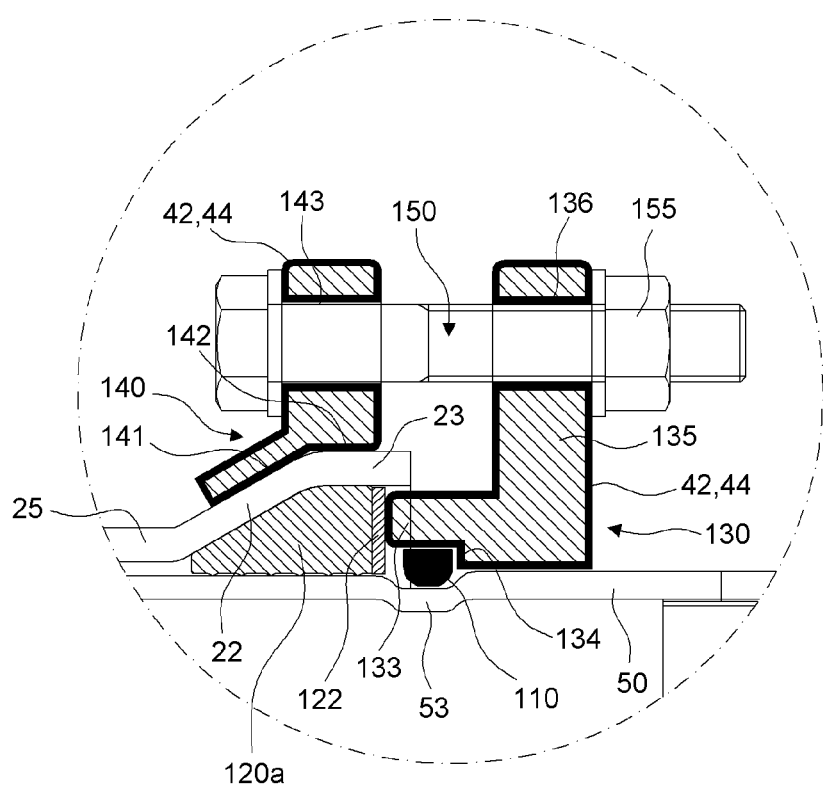
FIG. 14 is a cross-sectional view showing another connection structure of the composite pipe.

FIG. 14 is a cross-sectional view showing another connection structure of the composite pipe. Among the drawing reference numerals in FIG. 14, the same reference numerals as those in FIGS. 1 to 13 denote the same components.

Compared to the above-mentioned connection structure, the connection structure has a different watertight ring 120a and a stopper ring 110, and the other components are the same.

The watertight ring 120a has an inner surface formed horizontally, and an outer surface that matches the first inclined portion 22 and the first extended portion 23. By this configuration, the inner surface is in close contact with the outer surface of the short pipe portion 50 and the outer surface is in close contact with the first inclined portion 22 and the first extended portion 23.

The stopper ring 110 differs from the stopper ring of FIG. 12 in that it has flat outer and side surfaces. That is, since the flat outer surface and side surface of the stopper ring 110 match the step 134, the stopper effect can be increased.

What is claimed is:

1. A composite pipe comprising:
   a main portion; and,
   a short pipe portion having a shorter length than the main portion;
   wherein the short pipe portion is coupled to a first end of both ends of the main portion to be watertight, and liquid or gas can move through the short pipe portion and the main portion,
   wherein the main portion comprises
   an outer pipe;
   an inner pipe inserted into the outer pipe; and,
   a resin layer formed to cover an outer surface of the outer pipe;
   wherein the short pipe portion and the inner pipe are made of a material having greater corrosion resistance than the outer pipe,
   wherein a groove or a protrusion is continuously formed on an outer surface of the short pipe portion along a circumferential direction,
   wherein an end side of the short pipe portion is coupled to an end side of the outer pipe so as to be watertight,
   wherein the inner pipe extends further into the short pipe portion than the outer pipe, and an extended portion of the inner pipe is bonded or welded to an inner surface of the short pipe portion, and
   wherein a length of the extended portion is shorter than the length of the short pipe portion, and a portion of the short pipe portion to which the inner pipe is not extended is exposed to the liquid or gas.

2. The composite pipe according to claim 1,
   wherein an expansion portion is formed in a second end of the main portion,
   wherein when the composite pipe is connected to a second composite pipe identical to the composite pipe according to claim 1 by that the short pipe portion of the composite pipe is inserted into an expansion portion of the second composite pipe, and
   wherein the resin layer is integrally formed to cover at least the outer pipe's side of the short pipe portion from the groove or the protrusion.

3. The composite pipe according to claim 1,
   wherein a thickness of the short pipe portion is the same as a thickness of the outer pipe, and
   wherein the extended portion is bonded or welded to the inner surface of the short pipe portion while maintaining a straight state.

4. A connection structure of a composite pipe comprising:
   the composite pipe is formed by combining a main portion and a short pipe portion so as to be watertight,
   wherein the main portion comprising:
   an outer pipe; and, an inner pipe inserted into the outer pipe;

wherein the inner pipe extends further into the short pipe portion than the outer pipe to be coupled to an inner surface of the short pipe portion so as to be watertight, wherein the short pipe portion has a shorter length than the main portion, and a groove is continuously formed on an outer surface of the short pipe portion along a circumferential direction, and the short pipe portion and the inner pipe are made of greater corrosion-resistant material than the outer pipe, wherein among both ends of the main portion, an expansion portion is formed in one of the ends of the both ends opposite to the other end of the both ends coupled to the short pipe portion, and the short pipe portion is inserted into an expansion portion of an adjacent composite pipe, wherein the connection structure comprises:

a watertight ring inserted between the expansion portion of the adjacent composite pipe and the short pipe portion;

a flange having an insertion portion inserted between the expansion portion of the adjacent composite pipe and the short pipe portion and a fastening portion extending vertically from the insertion portion;

a support ring installed on the expansion portion of the adjacent composite pipe and having a ring shape; and, a fastening bolt fastening the flange and the support ring;

wherein a step or a groove is continuously formed along the circumferential direction at a portion corresponding to the groove on an inner surface of the insertion portion, wherein a stopper ring is installed in the groove, and a part of the stopper ring protrudes from the groove, and the part of the stopper ring is caught in the step or inserted into the groove, so that the flange is fixed to the short pipe portion and separation of the short pipe portion is prevented, and the flange is fixed to the short pipe portion, so that the support ring presses the expansion portion of the adjacent composite pipe against the watertight ring and the separation of the short pipe portion is prevented.

5. The connection structure of a composite pipe according to claim 4, wherein the stopper ring is made of stainless steel to limit a deformation of the stopper ring so as to prevent movement of the adjacent composite pipe and the flange, wherein the stopper ring is not a complete circle shape but an arc shape.

6. The connection structure of a composite pipe according to claim 4, wherein the expansion portion of the adjacent composite pipe has a first inclined portion and a first extended portion extending horizontally from the first inclined portion, wherein the watertight ring is installed on the first inclined portion or across the first inclined portion and the first extended portion, wherein the inner surface of the support ring has a third inclined portion and a third extended portion to match the first inclined portion and the first extended portion, and the third inclined portion contacts to the first inclined portion and the third extended portion contacts to the first extended portion by a fastening force of the fastening bolt.

7. The connection structure of a composite pipe according to claim 4, wherein a ring member is installed between the watertight ring and the insertion portion, wherein the ring member uniformly transmits a pressing force transmitted from the insertion portion to the watertight ring so that the watertight ring uniformly contacts the first inclined portion.

* * * * *